United States Patent [19]

Hinds et al.

[11] Patent Number: 5,339,266

[45] Date of Patent: Aug. 16, 1994

[54] PARALLEL METHOD AND APPARATUS FOR DETECTING AND COMPLETING FLOATING POINT OPERATIONS INVOLVING SPECIAL OPERANDS

[75] Inventors: Christopher N. Hinds; Eric V. Fiene; Daniel T. Marquette; Eric E. Quintana, all of Austin, Tex.

[73] Assignee: Motorola, Inc., Schaumburg, Ill.

[21] Appl. No.: 158,324

[22] Filed: Nov. 29, 1993

[51] Int. Cl.[5] .................................................. G06F 7/38
[52] U.S. Cl. ..................................................... 364/748
[58] Field of Search ............ 364/748, 745, 737, 736.5, 364/736

[56] References Cited

U.S. PATENT DOCUMENTS

| | | | |
|---|---|---|---|
| 4,534,010 | 8/1985 | Kobayashi et al. | 364/745 |
| 4,796,217 | 1/1989 | Takahashi et al. | 364/748 |
| 4,839,846 | 6/1989 | Hirose et al. | 364/748 |
| 4,941,120 | 7/1990 | Brown et al | 364/748 |
| 4,996,660 | 2/1991 | Beacom et al. | 364/748 |
| 5,038,313 | 8/1991 | Kojima | 364/745 |
| 5,058,048 | 10/1991 | Gupta et al. | 364/748 |
| 5,128,889 | 7/1992 | Nakano | 364/745 |
| 5,197,023 | 3/1993 | Nakayama | 364/745 |
| 5,257,214 | 10/1993 | Mason et al. | 364/748 |
| 5,262,973 | 11/1993 | Richardson | 364/736 |

*Primary Examiner*—Tan V. Mai
*Attorney, Agent, or Firm*—Keith E. Witek

[57] ABSTRACT

A method and apparatus for detecting and completing floating point operations involving special floating point operands is performed in parallel, via a circuit (24), to the operation of at least one floating point mathematical unit (18, 20or 22). The floating point control (30) along with registers (14 and 16) provide floating point operands and floating point control to the mathematical units (18, 20, and 22). If the mathematical units (18, 20, and 22) cannot perform a proper floating point calculation because of the presence of a special operand, then the circuit (24) will detect the special operand and complete the floating point operation in a proper manner by communicating with the floating point control unit (30).

22 Claims, 3 Drawing Sheets

PARALLEL METHOD AND APPARATUS FOR DETECTING AND COMPLETING FLOATING POINT OPERATIONS INVOLVING SPECIAL OPERANDS

FIELD OF THE INVENTION

The present invention relates generally to semiconductor circuits, and more particularly, to floating point systems and circuitry which is used to process special operands in a floating point system.

BACKGROUND OF THE INVENTION

In a floating point system that contains one mathematical unit which performs all the different floating point operations, there is a need for only one set of circuitry that detects special operand cases since there is only one operation occurring at any one time. When multiple floating point mathematical units are placed in a system, having each unit detect special case operands becomes redundant. Logic is duplicated and is inefficient use of integrated circuit space and may reduce speed if the circuitry is within a critical speed path.

Some systems are designed to only detect that a special operand has been found in a system, and that the normal circuitry will produce an erroneous result if the special operand is processed normally. These systems rely on software to generate the correct result for these special cases or the use of software-intensive exceptions. This use of software is extremely time consuming and inefficient for most applications.

SUMMARY OF THE INVENTION

The previously mentioned disadvantages are overcome and other advantages achieved with the present invention. In one form, the present invention comprises a data processing system. The data processing system has at least one floating point mathematical unit and a special floating point operand detect logic. The at least one floating point mathematical unit has a first input for receiving a first operand, a second input for receiving a second operand, and an output for providing a floating point result based upon the first and second operand. The output is coupled to an output bus. The special floating point operand detect logic detects a floating point operation and operands which result in incorrect floating point calculations in the at least one floating point mathematical unit. The special floating point operand detect logic provides a correct result to the output bus based upon the first and second operand and the floating point operation.

In another form, the invention comprises a method for performing floating point operations using special floating point operands in a data processing system. The method involves providing a first floating point operand to a special floating point circuit, providing a second floating point operand to the special floating point circuit, and providing at least one control signal to the special floating point logic to indicate to the special floating point logic which floating point operation is being performed. A determination is made if one of either a value of the first floating point operand or a value of the second floating point operand is a special floating point value. The correct floating point result is generated based upon the first and second floating point operands and the at least one control signal within the special floating point logic if the special floating point logic can generate the correct floating point result and if one of either a value of the first floating point operand or a value of the second floating point operand is a special floating point value.

The present invention will be more clearly understood from the detailed description below in conjunction with the accompanying drawings.

Figure 1:
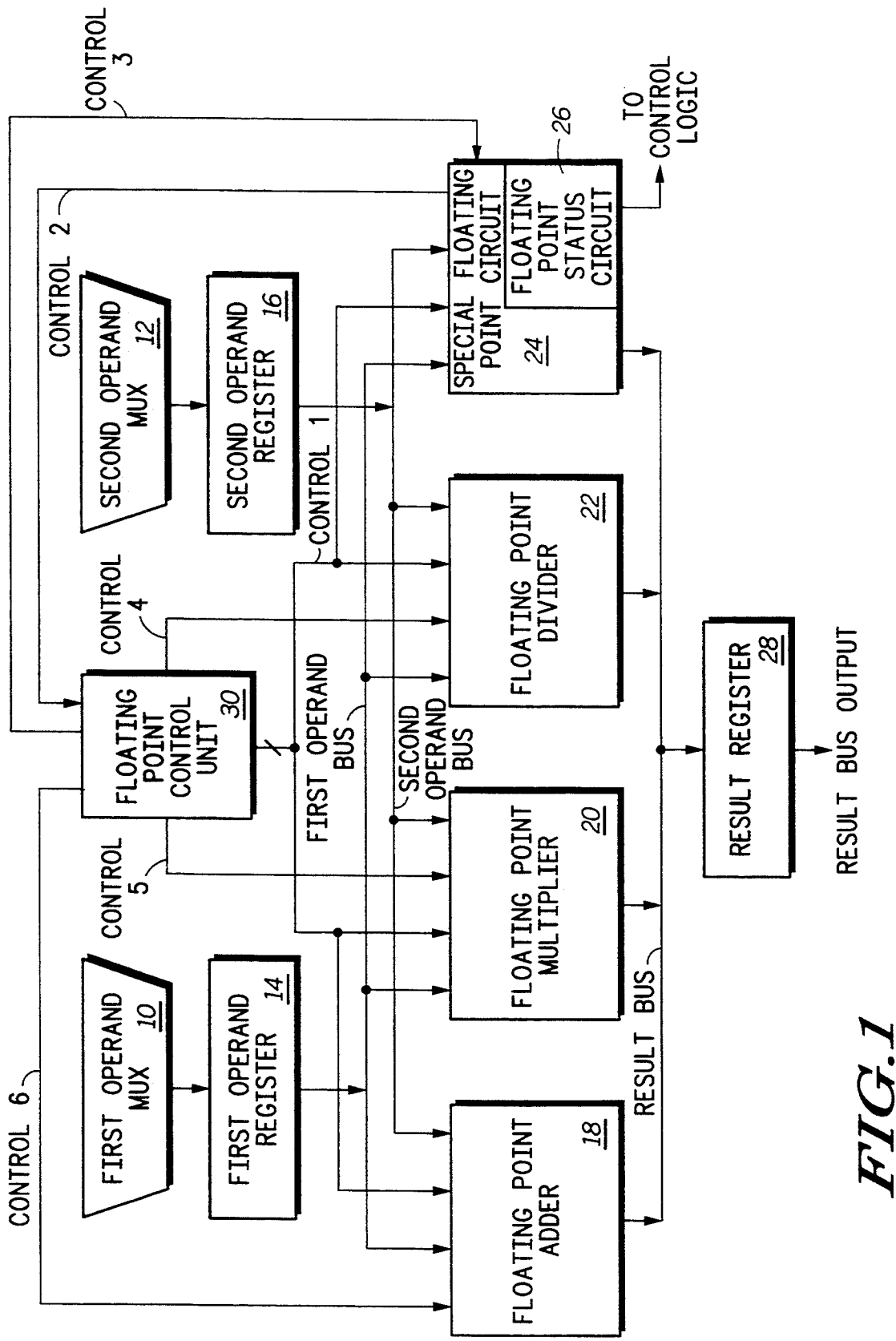
FIG. 1 illustrates, in a block diagram form, a floating point system in accordance with the present invention.

It will be appreciated that for simplicity and clarity of illustration, elements illustrated in the FIGURES have not necessarily been drawn to scale. For example, the dimensions of some of the elements are exaggerated relative to other elements for clarity. Further, where considered appropriate, reference numerals have been repeated among the FIGURES to indicate corresponding or analogous elements.

DESCRIPTION OF A PREFERRED EMBODIMENT

Generally, the present invention provides a method and apparatus for parallel detecting and completing floating point operations involving special floating point operands within a data processor. This is accomplished by providing a special floating point circuit that accepts floating point operands, determines if any of the operands are special, and if possible generates the correct floating point result based on the floating point operand(s) and operation. The special floating point circuit performs these operations in parallel with the floating point math units in order to be speed efficient.

Most floating point numbering system contain certain encodings of operands that represent special operands. These special floating point operands are considered discontinuities since methods for mathematical manipulation fail when a special operand is encountered. Known floating point systems which contain multiple floating point functional units such as a floating point adder, a floating point multiplier, a floating point divider, and the like, either simply signal to a control circuit that an exceptional condition has occurred upon detecting any one of the special operands or duplicate the detection and result generation logic for each functional unit (a waste of space) to individually detect any one of the special operands.

The use of the special floating point circuit described herein helps to reduces the size and complexity of floating point units. It also dramatically increases processor response time when special operand(s) are processed. In known floating point units, circuitry to detect a special operand is included in every floating point math unit which is definitely integrated circuit area-inefficient. In other words, this implementation often means that logic is duplicated between floating point math units since the same special floating point operands are detected in every unit. This invention reduces size and complexity by combining all the separate detection circuitry into one circuit and, in addition, provides a correct floating point result to replace the incorrect result from the normal floating point logic. The removal of duplicated logic is very advantageous.

Some floating point units when encountered with a special floating point operand simply signal an exception state or exception condition. The correct floating point result is then provided through other means such as through software or external/slower hardware. This invention increases performance and reduces external circuitry by providing the correct result at the same time the exceptional situation is detected.

Figure 2:
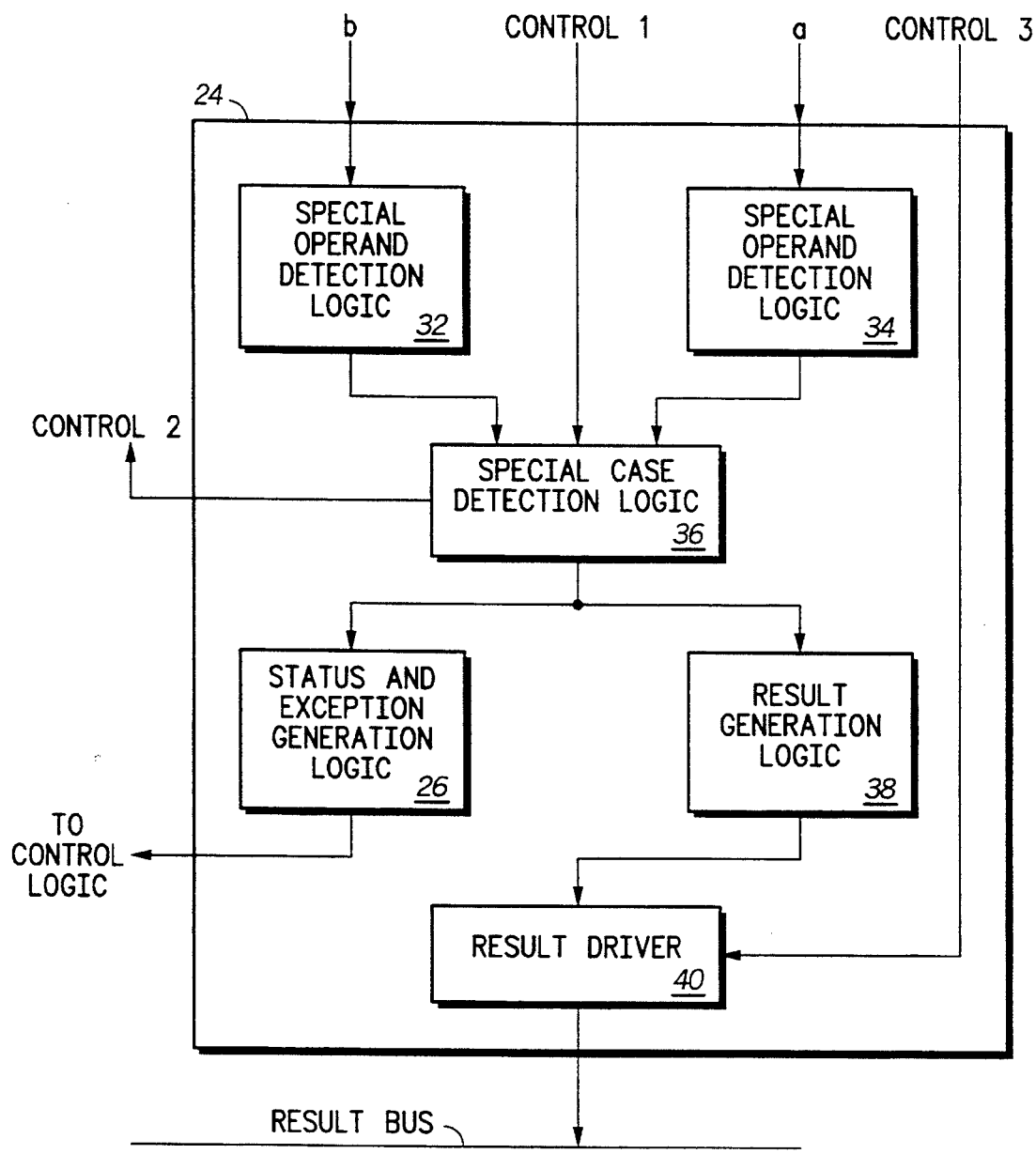
FIG. 2 illustrates, in a block diagram form, a more detailed version of the special floating point circuit of FIG. 1 in accordance with the present invention.
Figure 3:
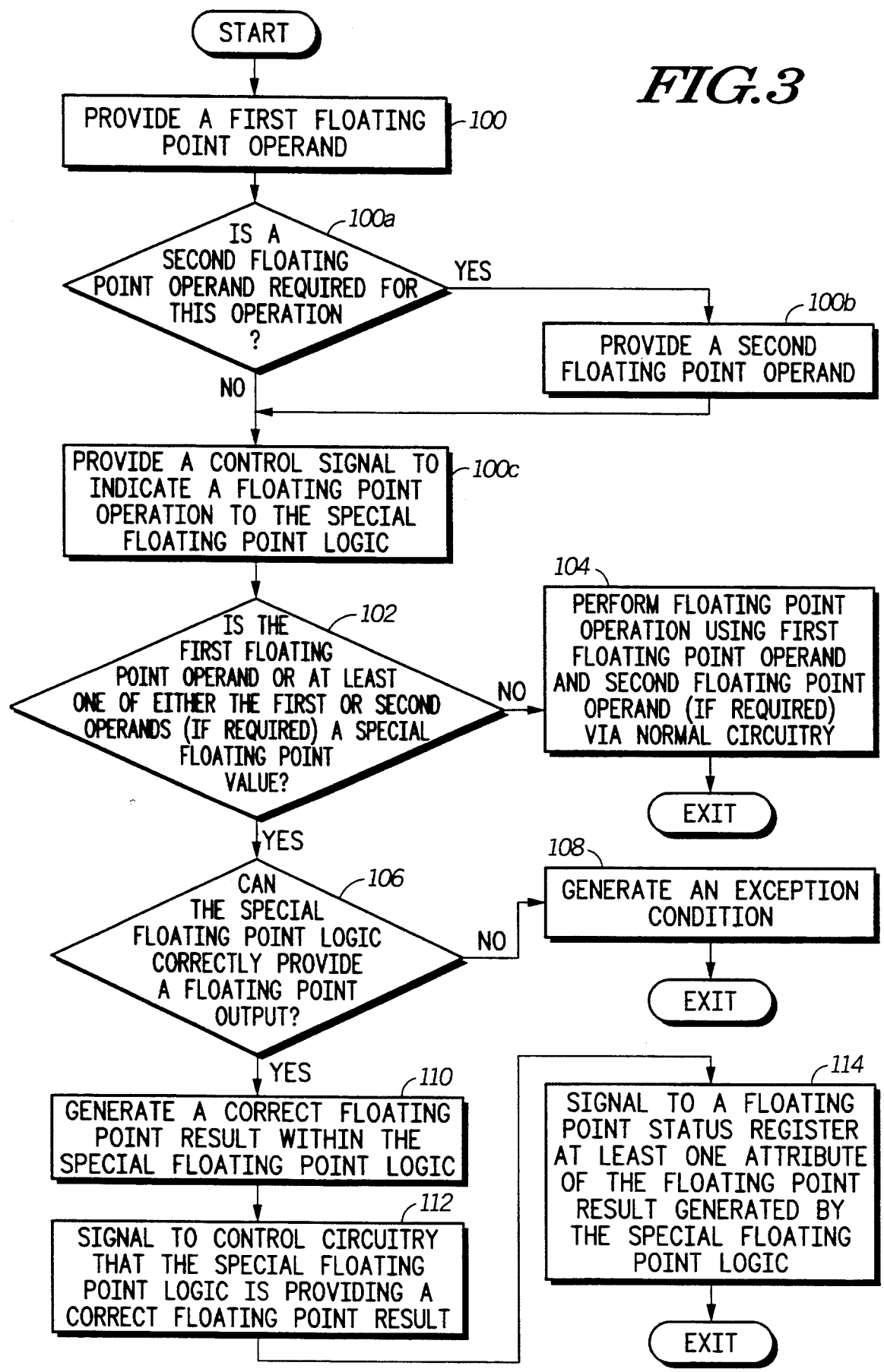
FIG. 3 illustrates, in a flowchart, a method for detecting and completing floating point operations involving special floating point operands, the method being in accordance with the present invention.

The present invention overcomes many of the disadvantages listed above and can be more fully understood with reference to FIGS. 1-3. FIG. 1 illustrates a portion of a data processing system which is used to perform floating point mathematical operations.

A first operand multiplexer (MUX) 10 and a first operand register 14 are used to provide a floating point operand to a first operand bus. The source of operands provided to the first operand multiplexer (MUX) 10 could be from a floating point register file, a memory subsystem, or a previous result from this portion of the data processing system. A second operand multiplexer (MUX) 12 and a second operand register 16 are used to provide a floating point operand to a second operand bus.

The first operand bus and the second operand bus provide data in a parallel fashion to a floating point adder 18, a floating point multiplier 20, a floating point divider 22, and a special floating point circuit 24.

A floating point control unit 30 sends general control information to the floating point adder 18, the floating point multiplier 20, the floating point divider 22, and the special floating point circuit 24 over a control signal "control 1". Mathematical unit specific control information is sent by the floating point control unit 30 to the floating point adder 18 over a "control 6", to the floating point multiplier 20 over a "control 5", to the floating point divider 22 over a "control 4", and to the special floating point circuit over a "control 3". Control information is sent from the special floating point circuit 24 to the floating point control unit 30 over a "control 2".

The floating point adder 18, floating point multiplier 20, floating point divider 22, and special floating point circuit 24 use the information provided on the first operand bus, second operand bus, and control lines to generate a result after a fixed number of clock cycles. Logic in the special floating point circuit 24 along with information in the floating point control unit 30 determines which result is placed on the result bus (or output bus) of FIG. 1. The floating point adder 18 provides results for floating point addition, subtraction, and integer conversion. The floating point multiplier 20 provides results for floating point multiply. The floating point divider 22 provides results for floating point division, move in, move out, and square root. The special floating point circuit 24 provides the result for all floating point operations in which one or more of the operands is a special operand. In addition to providing a result, the special floating point circuit 24 provides control information to a floating point status circuit 26 and the floating point control unit 30 via "control 2". Floating point rounding information is provided by control signals to the circuits 18, 20, 22, and 24 in order to allow round-to-nearest, round-up, round-down, and other floating point rounding modes.

A result register 28 reads the result bus to register the floating point result for the current floating point operation. The result register 28 provides a value to the result bus output. The result register 28 has an input which is multiplexed or selectively coupled to only one output of the circuits 18, 20, 22, and 24 via tri-state buffers or the like. Result register 28 itself may receive all signals (four sets of results in FIG. 1) and multiplex the correct output from control signal(s) (not illustrated as being coupled to result register 28).

The floating point status circuit 26 collects information about the result of the current floating point operation to update status bits which are part of the data processing units state information.

FIG. 2 illustrates the special floating point circuit 24 of FIG. 1 in more detail. FIG. 2 illustrates input operand a which corresponds to the input from the first operand bus of FIG. 1 and input operand b which corresponds to the input from the second operand bus of FIG. 1. "Control 1", which corresponds to "control 1" of FIG. 1 carries information as to which floating point operation is to be performed, floating point precision, and floating point operand size.

A special operand detection logic 32 takes in the operand b and outputs information as to which if any special operand type was detected to a special case detection logic 36. The special floating point operand types detected include Not A Number (NAN), zero, infinity, normalized, denormalized, and non-normalized floating point numbers. A special operand detection logic 34 provides a similar function as the special operand detection logic 32 but in reference to input operand a instead of input operand b. The special floating point operand types detected include those mentioned previously for special operand detection logic 32.

The special case detection logic 36 uses the special operand type information from both special operand detection units 32 and 34 along with information about the current floating point operation provided on "control 1" to determine if a situation has occurred where the result provided by the other floating point mathematical units (18, 20, and 22 of FIG. 1) is not valid. This situation is considered a special case. "Control 2" sends information to the floating point control unit 30 of FIG. 1 as to whether the current set of inputs constitute a special case. Information attributes of the result are also sent via "control 2", such as is the number positive, negative, zero, NAN, overflowed, etc. Information is also sent indicating that the result generated by the special floating point circuit should be used instead of the result produced by any other mathematical unit because the result produced by the units 18, 20, and/or 22 will be incorrect for some or all special operands. The special case detection logic 36 also sends information to a status and exception generation logic 26 and a result generation logic 38.

The result generation logic 38 takes the special case information from the special case detection logic and produces the appropriate floating point result. This result could be based on a constant, the floating point operation, and/or it could be based on the input operands a or b. The result generation logic 38 provides the generated result to a result driver 40.

The result driver 40 will drive the generated result onto the result bus which corresponds to the result bus of FIG. 1 based on information received by "control 3" which corresponds to "control 3" of FIG. 1. This information received is based partly on the information generated by the special case detection logic 36. The output of the circuit 24 is used, in a preferred form, to replace the incorrect output of the circuits 18, 20 and 22.

The status and exception generation logic 26 uses the special case detection information from the special case detection logic 36 to update status bits and to produce exception information to be used by control logic which is either internal or external to the data processor.

FIG. 3 illustrates a method for performing floating point operations when special operands are detected. FIG. 3 illustrates steps 100, 100a, 100b and 100c in which the floating point control logic provides the special floating point circuit with a first floating point operand, an optional second floating point operand, and at least one control signal to indicate a floating point operation to the special floating point logic. The steps 100, 100a, 100b, and 100c are used to indicate that one, two, or more than two operand instructions are possible. In step 102, the special floating point circuit 24 determines if the first floating point operand (in a single operand instruction) or at least one of either the first or second floating point operand (in a two operand instruction) is a special floating point value. This determination is made through random logic that implements a comparator type circuit. Step 104 is executed if step 102 determines that neither the first or second operand are a special operand. Step 104 performs the floating point operation using the first and second floating point operand, as required by the floating point operation, via normal circuitry. Step 104 is executed in the units shown in FIG. 1 as circuits 18, 20, or 22. Step 104 can be executed in parallel with steps 102, 106, 110, 112, and 114.

Step 106 is executed if step 102 finds that at least one of either the first or second floating point operands is a special floating point operand. In step 106, the special floating point circuit determines that, given this particular combination of operands, if the special floating point circuit can provide the correct floating point output. This determination is made through random logic that implements a lookup table function. Step 108 is executed if step 106 determines that the special floating point circuit can not provide the correct floating point output. In step 108, the special floating point circuit signals to the floating point control unit that an exception situation has occurred. If step 106 determines that the special floating point circuit can provide the correct floating point output for the special operand(s), step 110 is executed.

In step 110, the special floating point circuit 24 generates a correct floating point result within the result generation logic 38. The generation of the correct result is accomplished in random logic by implementing a table lookup. The result generated is a constant bit pattern or a bit pattern derived from all or part of the input operand(s). In step 112, the special floating point circuit signals to the floating point control circuitry that the special floating point circuit is providing a correct floating point result. In step 114, the special floating point circuit signals to a floating point status register at least one attribute of the floating point result generated by the special floating point circuit.

The present invention provides a method and apparatus for the parallel detecting and completing floating point operations involving special floating point operands. With such a method and apparatus, the problem of detecting and completing floating point operations involving special floating point operands can be handled efficiently in reduced integrated circuit area. By combining all the special operand detection logic into one unit, redundancy is eliminated thus saving space and increasing speed. By combining the result generation logic into the special operand detection logic, control complexity is reduced, system requirements are reduced, and overall system performance is increased.

While the present invention has been shown and described with reference to specific embodiments, further modifications and improvements will occur to those skilled in the art. For example, the number of floating point mathematical units can be arbitrary. In other words, two, three, four, or more units may be present in FIG. 1. The floating point mathematical operations are not limited to the ones mentioned here (multiplication, addition, subtraction, division). Other hardware can be used such as a floating point square root unit, floating point sine calculations, etc., for example. The size and number of operand busses is not limited to the sizes and numbers disclosed herein. The set of special case operands is not limited to only those special operands mentioned here. In fact, this method could be extended to any data processing system that utilizes an operand specification that contains the notion of normal and special operand types.

This invention could be extended to work in any data processing system or architecture which implements a numbering system that has discontinuities in its representation of numbers. If these discontinuities must be detected or processed differently, the use of a special circuitry to detect these special cases would prove beneficial. If once these special cases are detected, the special circuit itself provides the correct result, this too would prove beneficial as taught herein. It should also be mentioned that an adder circuit can easily function as a subtractor with minimal or no logic adjustments, especially if two's complement or one's complement numbers are utilized.

It is to be understood, therefore, that this invention is not limited to the particular forms shown and that it is intended in the appended claims to cover all modifications that do not depart from the spirit and scope of this invention.

What is claimed is:

1. A data processing system comprising:
   at least one floating point mathematical unit having a first input for receiving a first operand, a second input for receiving a second operand, and an output for providing a floating point result based upon the first and second operands, the output being selectively coupled to an output bus; and
   a special floating point operand detect logic, coupled in parallel to the at least one floating point mathematical unit and having a first input for receiving the first operand, a second input for receiving the second operand, and an output, the special floating point operand detect logic detecting a floating point operation and operands which result in an incorrect floating point calculation in the at least one floating point mathematical unit, the special floating point operand detect logic providing a correct result, via the output of the special floating point operand detect logic, to the output bus based upon the first and second operands and the floating point operation if the incorrect floating point calculation is detected, the output of the at least one floating point mathematical unit otherwise being provided.

2. The data processing system of claim 1 wherein the output bus is coupled to a result register.

3. The data processing system of claim 2 wherein the result register stores a result calculated by the at least one floating point mathematical unit if the result calculated by the at least one floating point mathematical unit is a correct floating point result, the result register storing a result from the special floating point operand detect logic when the at least one floating point mathematical unit does not properly compute the result based upon the first operand, the second operand, and the floating point computation.

4. The data processing system of claim 1 wherein a result value provided to the output bus is provided by a multiplexer having an output coupled to the output bus, a first input coupled to an output of the special floating point operand detect logic and a second input coupled to an output of the at least one floating point mathematical unit, wherein the multiplexer selects the result value from one of either the output of the at least one floating point mathematical unit or the special floating point operand detect logic.

5. The data processing system of claim 1 further comprising:
a floating point control unit coupled to each of the special floating point operand detect logic and the at least one floating point mathematical unit by at least one control signal.

6. The data processing system of claim 5 wherein the at least one control signal coupled to the at least one floating point mathematical unit provides floating point rounding information to allow the at least one floating point mathematical unit to properly round a result value and an output enable signal to selectively enable communication of the result value to the output bus.

7. The data processing system of claim 5 wherein the at least one control signal coupled to the special floating point operand detect logic provides an output enable signal to selectively enable communication of a result value, stored within special floating point operand detect logic, to the output bus.

8. The data processing system of claim 5 wherein the at least one control signal coupled to the special floating point operand detect logic allows the special floating point operand detect logic to communicate to the floating point control unit at least one bit which is asserted when the special floating point operand detect logic provides a floating point result to the output bus.

9. The data processing system of claim 1 wherein the at least one floating point mathematical unit comprises a floating point mathematical unit selected from a group consisting of: a floating point divider circuit, a floating point adder circuit, a floating point multiplier circuit, and a floating point subtractor circuit.

10. The data processing system of claim 1 wherein the at least one floating point mathematical unit comprises a floating point divider circuit, a floating point adder circuit, and a floating point multiplier circuit being coupled in parallel to one another.

11. The data processing system of claim 1 wherein the operands which result in incorrect floating point calculations in the at least one floating point mathematical unit are at least one operand selected from a group consisting of: a zero operand, an infinity operand, a not-a-number operand, a de-normalized operand, and a non-normalized operand.

12. A method for performing floating point operations with special floating point operands in a data processing system, the method comprising the steps of:
providing a first floating point operand to a special floating point logic;
providing a second floating point operand to the special floating point logic;
providing at least one control signal from the data processing system to the special floating point logic to indicate to the special floating point logic which floating point operation is being performed;
determining if a value of the first floating point operand is a special floating point value;
determining if a value of the second floating point operand is a special floating point value;
determining, based upon the at least one control signal, the first operand, and the second operand, if the special floating point logic has correctly processed the floating point operation using the first and second operands;
generating the correct floating point result based upon the first and second floating point operands and the at least one control signal within the special floating point logic if the special floating point logic is determined to have correctly processed the floating point operation;
signaling to a floating point control unit that the floating point operation is correctly performed by the special floating point logic if the special floating point logic has correctly processed the floating point operation; and
signaling to a floating point status circuit, by asserting at least one bit, an attribute of the value of the floating point result.

13. The method of claim 12 wherein the step of generating the correct floating point result comprises:
generating the correct floating point result based upon the first and second floating point operands within a floating point mathematical unit if neither of the first operand nor the second operand is a special floating point value.

14. The method of claim 12 wherein the step of generating the correct floating point result comprises:
loading the correct floating point result into a hardware result register within the data processing system via a bus internal to the data processing system.

15. A method for performing floating point operations using special floating point operands in a data processing system, the method comprising the steps of:
providing a first floating point operand to a special floating point circuit;
providing a second floating point operand to the special floating point circuit;
providing at least one control signal to the special floating point logic to indicate to the special floating point logic which floating point operation is being performed;
determining if one of either a value of the first floating point operand or a value of the second floating point operand is a special floating point value; and
generating the correct floating point result based upon the first and second floating point operands and the at least one control signal within the special floating point logic if the special floating point logic can generate the correct floating point result and if one of either a value of the first floating point operand or a value of the second floating point operand is a special floating point value.

16. The method of claim 15 wherein the floating point operations using the special floating point operands are performed via a special floating point circuit, the method further comprising the steps of:
calculating a floating point value in a normal floating point unit, the floating point value resulting from applying a floating point operation to the first and second floating point operands; and
selecting either the floating point value from the normal floating point unit or the correct floating point result from the special floating point circuit as a final result and allowing the data processor access to the final result.

17. The method of claim 16 wherein the steps of calculating a floating point value in a normal floating point unit, the floating point value resulting from applying a floating point operation to the first and second floating point operands and generating the correct floating point result based upon the first and second floating point operands and the at least one control signal within the special floating point logic if the special floating point logic can generate the correct floating point result and if one of either a value of the first floating point operand or a value of the second floating point operand is a special floating point value are performed in an overlapping period of time.

18. A data processing system comprising:
a first storage circuit for providing a first floating point value comprising a mantissa and an exponent;
a second storage circuit for providing a second floating point value comprising a mantissa and an exponent;
at least two floating point mathematical units coupled in parallel, each of the two floating point mathematical units having a first input for receiving the first floating point value, a second input for receiving the second floating point value, and an output for providing a floating point result based upon the first and second floating point values, each of the at least two floating point units performing a different mathematical operation on the first floating point value and the second floating point value, the operation being selected from the group consisting of: subtraction, addition, multiplication, and division;
a special floating point operand detect logic for detecting a floating point operation and operands which result in incorrect floating point calculations in the at least two floating point mathematical units, the special floating point operand detect logic providing a special result to an output based upon the first and second operand and the floating point operation; and
a selector circuit having an input for receiving the special result provided by the special floating point operand detect logic and a second input for receiving the floating point result provided by the at least two floating point mathematical units and an output for providing an output value, wherein the output value is a correct output selected as either the special result provided by the special floating point operand detect logic or the floating point result provided by the at least two floating point mathematical units by the selector circuit.

19. The data processing system of claim 18 wherein the at least two floating point mathematical units comprises a floating point divider circuit, a floating point adder circuit, and a floating point multiplier circuit being coupled in parallel to one another.

20. The data processing system of claim 18 wherein an output bus is coupled between the output of the selector circuit and a result register, the result register being used to store the output value.

21. A data processing system comprising:
at least one floating point mathematical unit having an input for receiving at least one operand and an output for providing a floating point result based upon the at least one operand, the output being coupled to an output bus; and
a special floating point operand detect logic for detecting a floating point operation and at least one operand which result in incorrect floating point calculations in the at least one floating point mathematical unit, the special floating point operand detect logic having an input and an output which are respectively coupled in parallel to the input and output of the at least one floating point mathematical unit, the special floating point operand detect logic selectively providing a correct result to the output bus based upon the at least one operand and the floating point operation.

22. A data processing system for processing a floating point operation, the data processing system comprising:
a floating point addition unit for receiving a first floating point operand and a second floating point operand and providing an addition output;
a floating point multiplication unit coupled in parallel to the floating point addition unit for receiving the first floating point operand and the second floating point operand and providing a multiplication output;
a floating point division unit coupled in parallel to the floating point addition unit for receiving the first floating point operand and the second floating point operand and providing a division output;
a special processing unit for both accessing the first and second floating point operands and identifying the floating point operation to determine if one of the floating point addition unit, floating point multiplication unit, and floating point division unit is capable of providing a correct output, the special processing unit generating a special output if none of the floating point addition unit, floating point multiplication unit, and floating point division unit is capable of providing a correct output; and
control circuitry for selecting the correct output from one of either the addition output, the multiplication output, or the division output as a selected output if one of the floating point addition unit, floating point multiplication unit, and floating point division unit provides a correct output and selecting the special output from the special processing unit if none of the floating point addition unit, floating point multiplication unit, and floating point division unit provides a correct output.

* * * * *